United States Patent
Lee et al.

(10) Patent No.: US 9,332,460 B2
(45) Date of Patent: May 3, 2016

(54) APPARATUS AND METHOD FOR CIRCUIT SWITCHED FALLBACK

(71) Applicant: MediaTek Inc., Hsin-Chu (TW)

(72) Inventors: Chi-Chen Lee, Taipei (TW); Hung-Yueh Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 202 days.

(21) Appl. No.: 14/039,189

(22) Filed: Sep. 27, 2013

(65) Prior Publication Data

US 2014/0113636 A1   Apr. 24, 2014

Related U.S. Application Data

(60) Provisional application No. 61/717,352, filed on Oct. 23, 2012.

(51) Int. Cl.
| | | |
|---|---|---|
| *H04W 36/00* | (2009.01) | |
| *H04W 76/02* | (2009.01) | |
| *H04W 48/16* | (2009.01) | |

(52) U.S. Cl.
CPC .......... *H04W 36/0022* (2013.01); *H04W 36/00* (2013.01); *H04W 76/02* (2013.01); *H04W 48/16* (2013.01)

(58) Field of Classification Search
CPC ...... H04W 36/00; H04W 36/14; H04W 76/02
USPC ............................ 370/328, 331; 455/436, 437
See application file for complete search history.

(56) References Cited

U.S. PATENT DOCUMENTS

| | | | | |
|---|---|---|---|---|
| 2010/0304749 A1* | 12/2010 | Dwyer et al. | ................. | 455/443 |
| 2010/0316000 A1* | 12/2010 | Burbidge et al. | ............ | 370/328 |
| 2011/0176485 A1* | 7/2011 | Pudney et al. | ................ | 370/328 |
| 2012/0202500 A1* | 8/2012 | Wu | .............................. | 455/436 |
| 2013/0084866 A1* | 4/2013 | Martin et al. | ................. | 455/436 |
| 2013/0301466 A1* | 11/2013 | Nenner | ......................... | 370/252 |

FOREIGN PATENT DOCUMENTS

WO    WO 2012/100946 A2 *   8/2012   ............ H04W 36/00

OTHER PUBLICATIONS

3GPP TS36.331 V11.1.0 Sep. 2012.*
3GPP TS23.272 V11.2.0 Sep. 2012.*

* cited by examiner

*Primary Examiner* — William Nealon
(74) *Attorney, Agent, or Firm* — McClure, Qualey & Rodack, LLP (57) ABSTRACT

The method and apparatus for CSFB are provided. The method includes transmitting a MO CS request to a LTE network or receiving a MT CS call notification from a LTE network; triggering or accepting a CSFB procedure by the UE; receiving redirection information from the LTE network; judging whether system information corresponding to candidate cells is provided in the redirection information; acquiring system information corresponding to candidate cells, wherein the system information includes location area identifications (LAI) corresponding to candidate cells in the redirection information to determine whether the candidate cells belong to a registered LA; setting the candidate cell belonging to the registered LA to a higher priority; selecting the candidate cell with the higher priority as a target cell; and connecting to the target cell first.

21 Claims, 9 Drawing Sheets

FIG. 6

APPARATUS AND METHOD FOR CIRCUIT SWITCHED FALLBACK

CROSS REFERENCE TO RELATED APPLICATIONS

This application claims priority of U.S. Provisional Patent Application No. 61/717,352, filed on Oct. 23, 2012, the entirety of which is incorporated by reference herein.

BACKGROUND OF THE INVENTION

1. Field of the Invention

The invention generally relates to the circuit switched fallback (CSFB), and more particularly, to determine whether the candidate cell belongs to the registered location area (LA) in CSFB process.

2. Description of the Related Art

With growing demand for mobile communications, the Global System for Mobile communications (GSM) supporting only circuit-switched (CS) domain services no longer meets user requirements. Accordingly, the mobile communications working groups and standard groups have developed the so-called third generation mobile communications technologies, such as Wideband Code Division Multiple Access (W-CDMA), Code Division Multiple Access-2000 (CDMA-2000), Time Division-Synchronous Code Division Multiple Access (TD-SCDMA), etc. Take the Universal Mobile Telecommunications System (UMTS) using the W-CDMA technology, for example: the 3rd Generation Partnership Project (3GPP) has further proposed the Long Term Evolution (LTE) system, and called for the fourth generation mobile (4G) communications system to be implemented to meet future demand for large wireless data-transmission bandwidths. The LTE system aims to provide an all-IP architecture, in which only a packet-switched (PS) domain, instead of a CS domain, is used to carry all mobile communications services. Also, voice services are provided by Voice over Internet Protocol (VoIP) in the fourth generation mobile communications system, instead of the CS domain as per the second and third generation (2G/3G) mobile communications systems.

However, during transition from the second and third generation mobile communications systems to the fourth generation mobile communications system, some operators have still chosen to provide voice services via the CS domain of the second and third generation mobile communications systems, due to the coverage rate and capacity of the CS domain of the second and third generation mobile communications system being already sufficient. This raises a problem wherein the architecture of the second and third generation mobile communications systems comprise both the CS domain and PS domain, while the fourth generation mobile communications system comprises only the PS domain. Accordingly, the interconnection between the second and third generation mobile communications systems and the fourth generation mobile communications system, especially the CS domain part, must be defined and specified, so that systems of different standards can achieve smooth interoperability to provide voice services to users. One technique used is the Circuit Switched Fallback (CSFB) architecture, which is defined in the 3GPP TS 23.272 specification.

However, in the CSFB architecture, the UE may need to perform a Location Area Update (LAU) during the CSFB procedure when the location area (LA) of the CSFB target of the second or third generation cell is different from the registered LA. Therefore, this Location Area Update may generate an extra call-setup delay.

BRIEF SUMMARY OF THE INVENTION

Apparatus and methods for CSFB are provided to overcome the above-mentioned problems.

An embodiment of the invention provides a method for Circuit Switched Fallback (CSFB) by a user equipment (UE), comprising: triggering a CSFB procedure by a MO CS call or accepting the CSFB procedure by a MT CS call; receiving redirection information from the LTE network; judging whether system information corresponding to candidate cells is provided in the redirection information; acquiring system information corresponding to candidate cells if the system information corresponding to candidate cells is provided in the redirection information, wherein the system information includes location area identifications (LAI) corresponding to candidate cells in the redirection information to determine whether the candidate cells belong to a registered LA; checking stored information previously collected by the UE to determine whether the candidate cells belong to the registered LA, if the system information corresponding to candidate cells is not provided in the redirection information; setting the candidate cell belonging to the registered LA to a higher priority; ordering the candidate cells based on the priority, wherein the candidate cell with higher priority is selected as a target cell; and connecting to the target cell first.

An embodiment of the invention provides method for Circuit Switched Fallback (CSFB) by a user equipment (UE), comprising: triggering a CSFB procedure by a MO CS call or accepting the CSFB procedure by a MT CS call; receiving redirection information from the LTE network; and processing a load-balancing process for candidate cells not belonging to the registered LA in the redirection information.

An embodiment of the invention provides a method for Circuit Switched Fallback (CSFB) for a user equipment (UE), comprising: triggering a CSFB procedure by a MO CS call or accepting the CSFB procedure by a MT CS call; triggering the UE to perform an inter-radio access technology (inter-RAT) measurement by the LTE network; measuring a list of candidate cells of the inter-RAT; adjusting a measurement order of the list of candidate cells according to stored information previously collected by the UE, wherein the candidate cell belonging to the registered LA is set to a higher priority and measured first; issuing a measurement report of the candidate cell with the higher priority to the LTE network first; receiving a changing cell command from the LTE network; and switching the UE to the candidate cell with the higher priority.

An embodiment of the invention provides an apparatus for Circuit Switched Fallback (CSFB), operating as a User Terminal (UE), comprising: an RF signal processing device, configured to transmit a MO CS call request to a LTE network or receive a MT CS call notification from the LTE network; a processor, configured to trigger or accept a CSFB procedure, wherein the transceiver receives redirection information sent from the LTE network after the CSFB procedure is triggered; and a detection module, configured to determine whether system information corresponding to candidate cells is provided in the redirection information, wherein the processor sets candidate cells from the redirection information which belong to a registered LA to a higher priority, then selects the candidate cell with the higher priority as a target cell and connects to the target cell first.

An embodiment of the invention provides An apparatus for Circuit Switched Fallback (CSFB), operating as a User Terminal (UE), comprising: an RF signal processing device, configured to transmit a MO CS call request to a LTE network or receive a MT CS call notification from the LTE network and issue a measurement report to the LTE network; and a processor, configured to trigger or accept a CSFB procedure, perform an inter-radio access technology (inter-RAT) measurement, measure a list of candidate cells of the inter-RAT, and adjust a measurement order of the list of candidate cells according to stored information previously collected by the UE, wherein the candidate cell belonging to the registered LA is set to a higher priority and measured first, wherein the LTE network transmit a changing cell command to the UE according to the measurement report of the candidate cell with the higher priority to the LTE network for switching the UE to the candidate cell with the higher priority.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
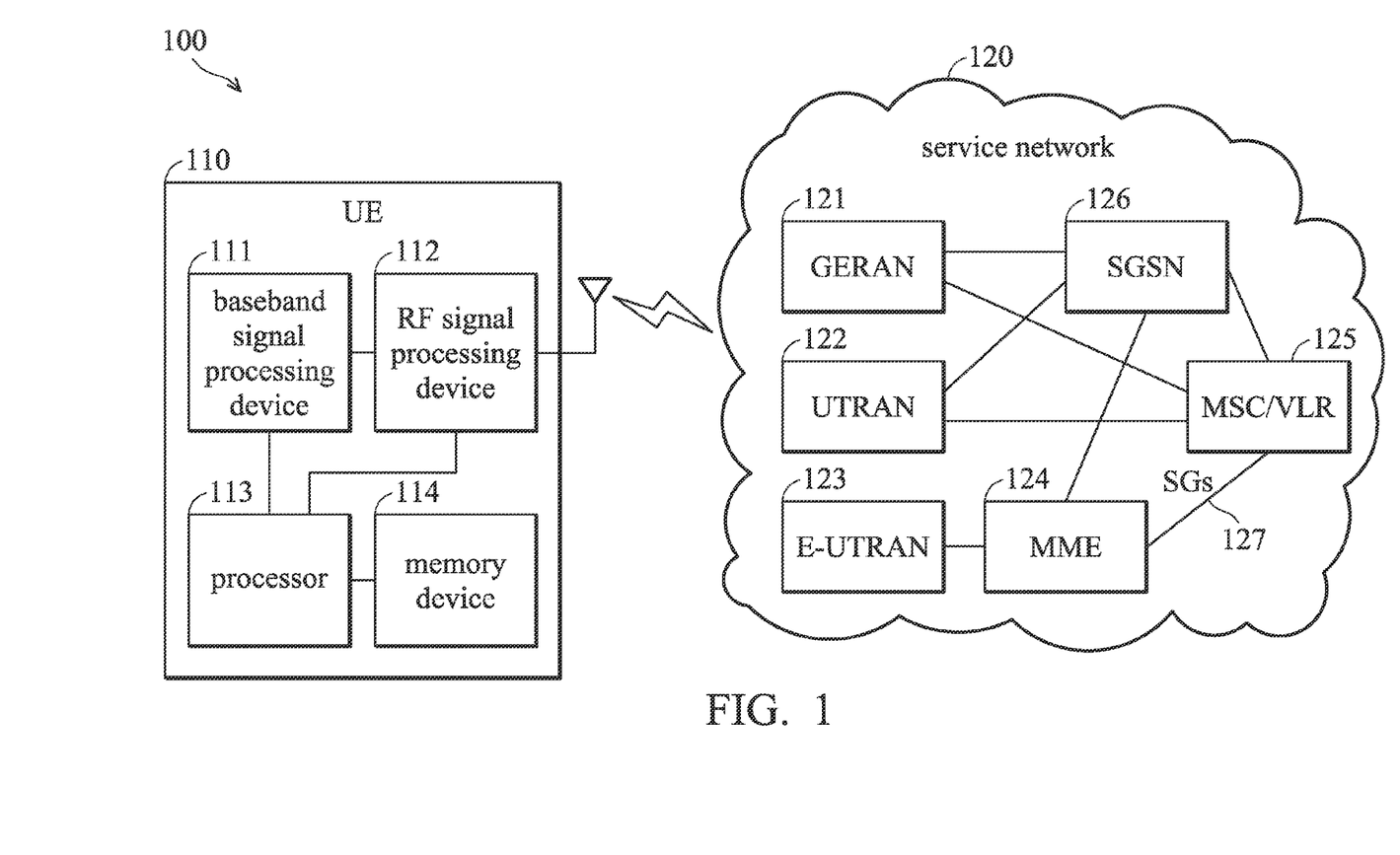
FIG. 1 is a block diagram of a mobile communications system 100 for CSFB according to an embodiment of the invention.

FIG. 1 is a block diagram of a mobile communications system 100 for CSFB according to an embodiment of the invention. The system 100 comprises a User Equipment (UE) 110, and a service network 120. The UE 110 may be a mobile communications device, such as a cellular phone, a smart-phone modem processor, a data card, a laptop stick, a mobile hotspot, a USB modem, a tablet, and others.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, or others.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied with specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s). In addition, the processor 113 further comprises a detection module (not present in FIG. 1), wherein the detection module is configured to determine whether system information corresponding to candidate cells is provided in the redirection information. The memory device 114 may store the software and firmware program codes, system data, user data, etc. of the UE 110. The memory device 114 may be a volatile memory, e.g. a Random Access Memory (RAM), or a non-volatile memory, e.g. a flash memory, Read-Only Memory (ROM), or hard disk, or any combination thereof. In an embodiment of the invention, the memory device 114 stores the system information which the UE 110 collected previously.

According to an embodiment of the invention, the RF signal processing device 112 and the baseband signal processing device 111 may be collectively regarded as a radio module capable of communicating with a wireless network to provide wireless communications services in compliance with a predetermined Radio Access Technology (RAT). Note that, in some embodiments of the invention, the UE 110 may further be extended to comprise more than one antenna and/or more than one radio module, and the invention should not be limited to what is shown in FIG. 1.

In addition, in some embodiments of the invention, the processor 113 may be configured inside of the baseband signal processing device 111, or the UE 110 may comprise another processor configured inside of the baseband signal processing device 111. Thus the invention should not be limited to the architecture as shown in FIG. 1.

The service network 120 comprises a GSM EDGE Radio Access Network (GERAN) 121, a Universal Terrestrial Radio Access Network (UTRAN) 122, an Evolved Universal Terrestrial Radio Access Network (E-UTRAN) 123, a mobility management entity (MME) 124, a mobile switching center (MSC)/visitor location register (VLR) 125, and a serving general packet radio service (GPRS) support node (SGSN) 126. The MME 124 communicates with the MSC/VLR 125 via a SGs interface 127. In the CSFB process, the UE 110 may use the GERAN 121 or the UTRAN 122 to connect to the CS domain, and use the E-UTRAN 123 to connect to a packet switched (PS) domain (e.g., a long term evolution (LTE) network). When CS services, e.g. a mobile terminating voice call, are processed, a page for CS services is received in the MSC 125, it is forwarded to the UE 110 via the MME 124 (using the SGs-interface 127) and then the UE 110 performs fallback to GERAN 121 or UTRAN 122 and responds to paging via the selected RAN (Radio Access Network). Similar behavior applies for CS services originating in the UE 110. When these are triggered and the UE 110 is camping on E-UTRAN 123, the UE 110 performs fallback to GERAN 121 or UTRAN 122 and triggers initiation of the CS service there. The CSFB process has different solutions, such as the Redirection mechanism and Measurement mechanism (Handover or CellChangeOrder). In the Redirection mechanism, the LTE network may previously provide redirection information to the UE. In the Measurement mechanism, the LTE network may request the UE to perform an inter-Radio Access Technology (inter-RAT) measurement and send the measurement report to the LTE network. The steps in the Redirection mechanism and Measurement mechanism are discussed in more detail below.

Figure 2A:
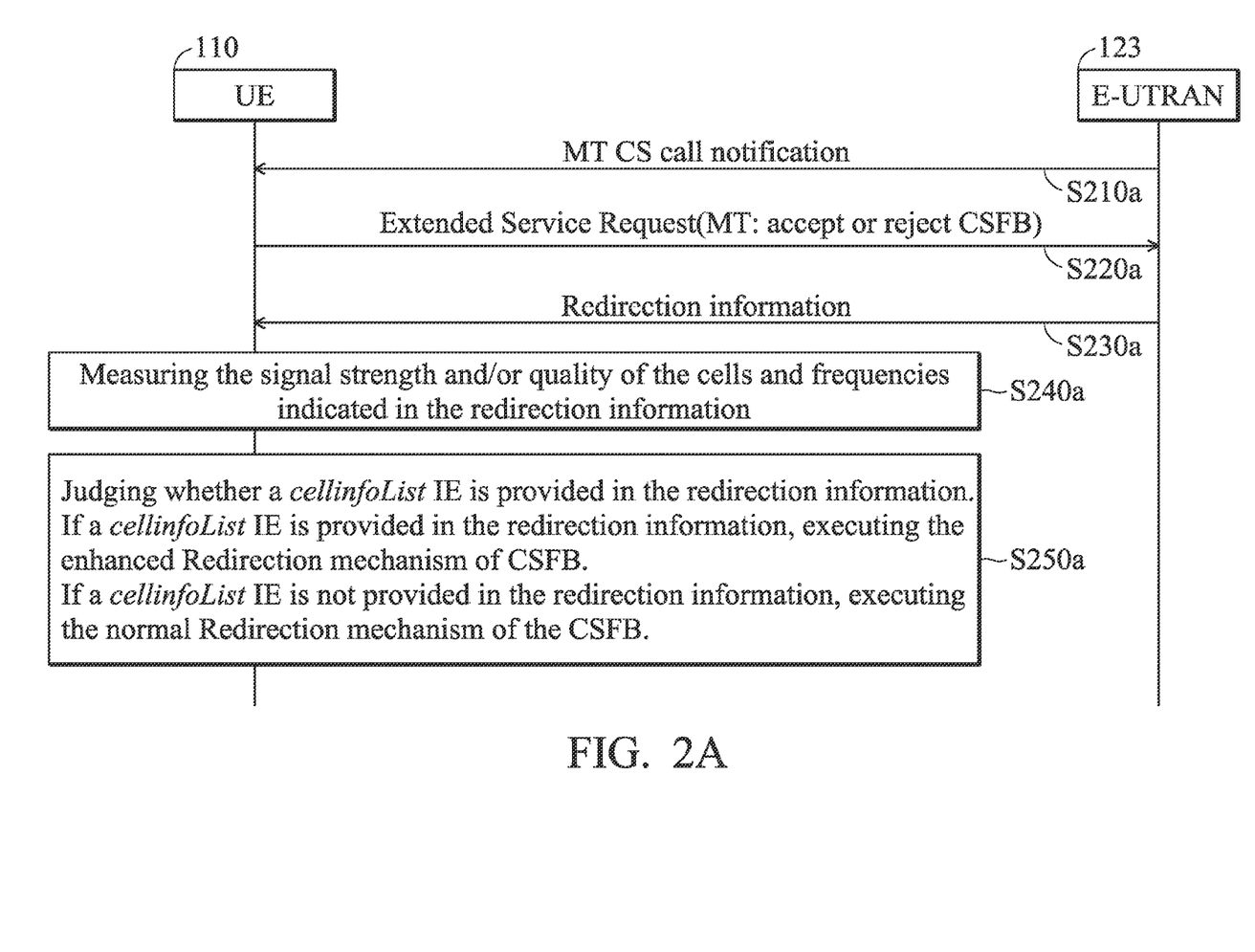
FIG. 2A is a message sequence chart illustrating the CSFB procedure based on the Redirection mechanism in a mobile communications system according to an embodiment of the invention.

FIG. 2A is a message sequence chart illustrating the CSFB procedure based on the Redirection mechanism in a mobile communications system according to an embodiment of the invention. First, the UE 110 may receive a Mobile Terminating (MT) CS call notification from the E-UTRAN 123 (LTE network) (Step S210*a*). Then the UE 110 may accept or reject the CSFB procedure by sending Extended Service Request message to the E-UTRAN (Step S220*a*) through a MT CS call. When the UE 110 accepts the CSFB procedure by the MT CS call, the E-UTRAN 123 may transmit the redirection information to the UE 110 (Step S230*a*). The redirection information is included in the RRCConnectionRelease message, and the redirection information comprises cells and frequencies information indicating to the UE 110 which cells are potential candidate cells or on which frequencies the candidate cells may be detected. After step S230*a*, the UE may measure the signal strength and/or quality of the cells and frequencies indicated in the redirection information (Step S240*a*). After step S240*a*, the UE 110 may judge whether a cellinfoList IE is provided in the redirection information (Step S250*a*). Note that step S240*a* is an optional step. Therefore, the UE also doesn't need to measure the signal strength and/or quality of the cells and frequencies indicated in the redirection information, and executes step S250*a* directly. In addition, in an embodiment of the invention, step S240*a* may be executed after step S250*a*.

Figure 2B:
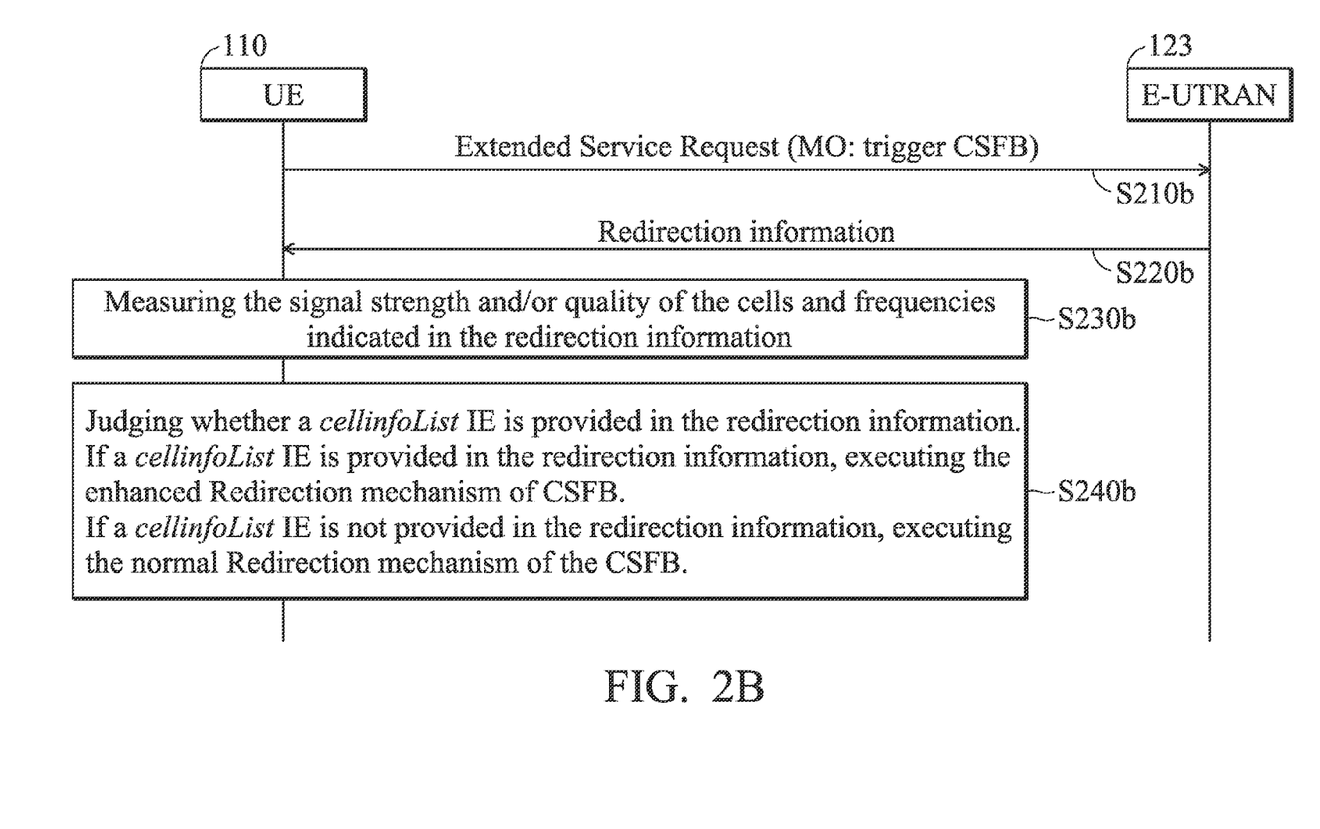
FIG. 2B is a message sequence chart illustrating the CSFB procedure based on the Redirection mechanism in a mobile communications system according to another embodiment of the invention.

FIG. 2B is a message sequence chart illustrating the CSFB procedure based on the Redirection mechanism in a mobile communications system according to another embodiment of the invention. First, the UE 110 may trigger the CSFB procedure by sending Extended Service Request message to the E-UTRAN through a Mobile Originating (MO) CS call (Step S210*b*). When the UE 110 triggers the CSFB procedure by the MO CS call, the E-UTRAN 123 may transmit the redirection information to the UE 110 (Step S220*b*). The redirection information is included in the RRCConnectionRelease message, and the redirection information comprises cells and frequencies information indicating to the UE 110 which cells are potential candidate cells or on which frequencies the candidate cells may be detected. After step S220*b*, the UE may measure the signal strength and/or quality of the cells and frequencies indicated in the redirection information (Step S230*b*). After step S230*b*, the UE 110 may judge whether a cellinfoList IE is provided in the redirection information (Step S240*b*). Note that step S230*b* is an optional step. Therefore, the UE also doesn't need to measure the signal strength and/or quality of the cells and frequencies indicated in the redirection information, and executes step S240*b* directly. In addition, in an embodiment of the invention, step S230*b* may be executed after step S240*b*.

If a cellinfoList IE is provided in the redirection information, the UE 110 may execute the enhanced Redirection mechanism of CSFB. In the enhanced Redirection mechanism, the UE 110 may get the system information of the candidate cells according to the cellinfoList IE. The system information includes location area identifications (LAI) corresponding to the candidate cells. Therefore, the UE 110 can judge whether the candidate cells belong to a registered LA according to the system information.

If a cellinfoList IE is not provided in the redirection information, the UE 110 may execute the normal Redirection mechanism of the CSFB. In a normal Redirection mechanism, the LTE network doesn't provide the cellinfoList IE. Therefore, the UE 110 may check the stored information previously collected by the UE 110 to determine whether any of the candidate cells belong to the registered LA. In an embodiment of the invention, the stored information collected by the UE 110 may be from a PLMN (Public Land Mobile Network) list, CSG (Closed Subscriber Group) list, Autonomous search, fingerprint collection or history collection. For example, the PLMN list provides a list of surrounding cells when the user has selected the network manually. Therefore, the UE 110 can judge whether the candidate cell belongs to the registered LA according to the cells reported during the PLMN list procedure. In an embodiment of the invention, the UE 110 can collect the fingerprints of frequently visited LTE cells (e.g. the 50 most frequently visited LTE cells of the UE 110). In terms of fingerprint collection, a fingerprint can be collected through a frequency scan or inbound/outbound mobile from frequently visited LTE cells by the UE 110. Fingerprint information may be updated periodically. In addition, the UE 110 may only collect the LA of 2/3G cells when the signal quality and/or signal power of the 2/3G cells cell is higher than a threshold value. In an embodiment of the invention, the stored information further comprises the location-update history of CSFB procedures triggered in the frequently visited LTE cells. In this embodiment, the UE 110 can collect the location area update history of CSFB procedures triggered in the frequently visited LTE cells (e.g. the 50 most frequently visited LTE cells) and the UE 110 records whether the UE has performed the location area update on the candidate cell (prior to the call setup) during the CSFB procedure. If the UE has performed location area update on the candidate cell (prior to the call setup) during the CSFB procedure, the candidate cell may be marked as a lower priority or less preferred CSFB cell. If the UE has not performed location area update on the candidate cell (prior to the call setup) during the CSFB procedure, the candidate cell may be marked as a higher priority or preferred CSFB cell.

In an embodiment of the invention, when the candidate cell belongs to the registered LA, the UE 110 may set it to a higher priority and connect to the cell. For example, if there are two candidate cells that have similar signal strength and quality, but one cell belongs to the registered LA and the other cell does not belong to the registered LA, the UE 110 may select the candidate cell belonging to the registered LA. Therefore, the LA update is avoided. In an embodiment of the invention, the UE 110 may process a load-balancing process if there are more than one target cells selected from the candidate cells, i.e. there are more than one target cells in the registered LA. When there are more than one target cells that belong to the registered LA, if all UEs in the registered LA select the same target cell with the best signal strength and quality, it may cause congestion at the target cell. Therefore, the UE can define a qualified threshold by the load-balancing process, i.e. the UE does not need to select the target cell with the best signal strength and/or quality; it only needs to randomly select from one of the target cells with signal strength and/or quality that are higher than the threshold. Therefore, the load-balancing process can avoid having all the UEs in the registered LA select the same target cell with the best signal strength and/or quality. In an embodiment of the invention, the UE 110 may also process a load-balancing process if no candidate cell belongs to registered LA.

Figure 3A:
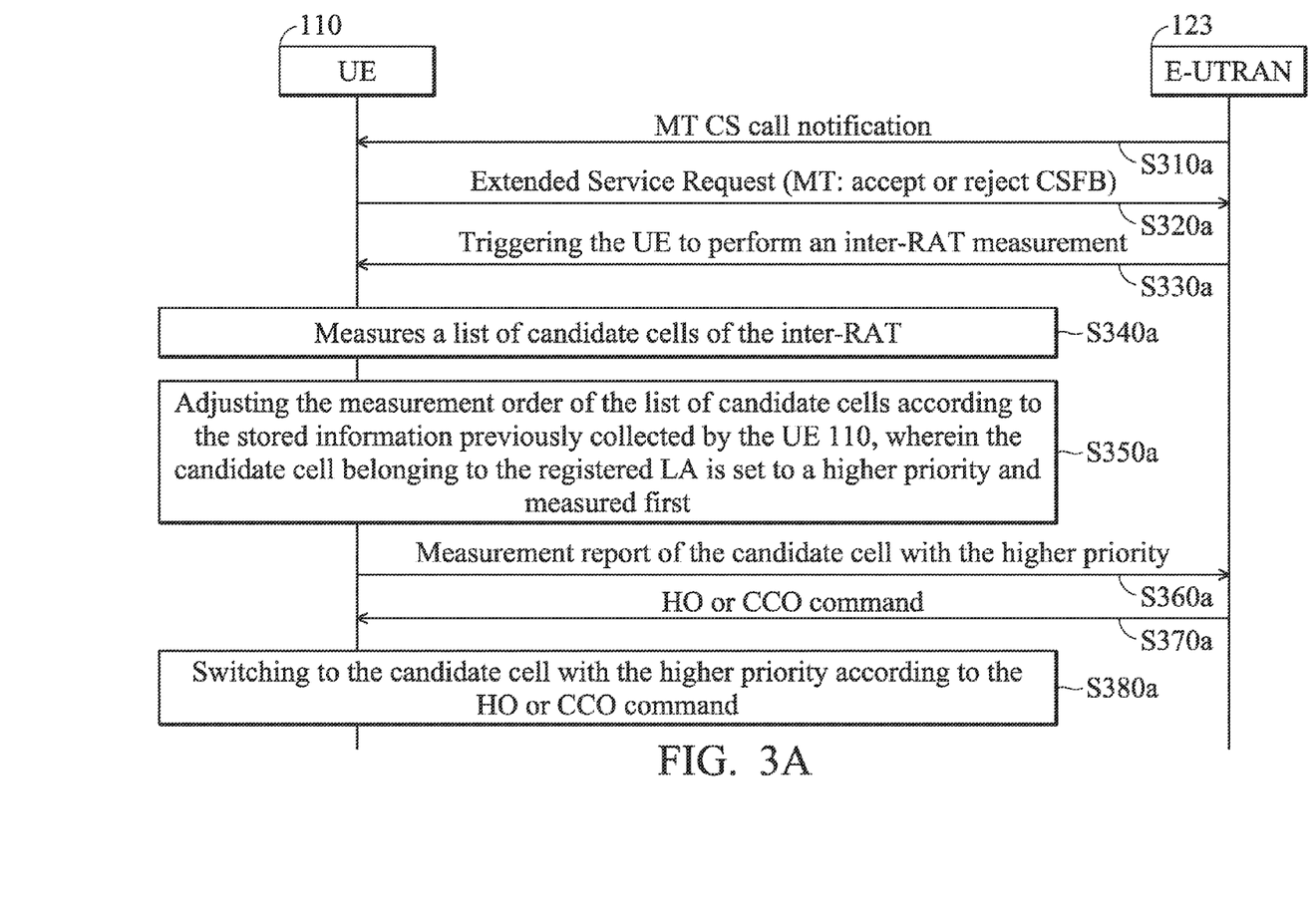
FIG. 3A is a message sequence chart illustrating the CSFB procedure based on the Measurement mechanism in a mobile communications system according to an embodiment of the invention.

FIG. 3a is a message sequence chart illustrating the CSFB procedure based on the Measurement mechanism in a mobile communications system according to an embodiment of the invention. First, the UE 110 may receive a MT CS call notification from the E-UTRAN 123 (LTE network) (Step S310*a*). Then the UE 110 may accept or reject the CSFB procedure by sending Extended Service Request message to the E-UTRAN through a MT CS call (Step S320*a*). After the UE 110 accepts the CSFB procedure by the MT CS call, the E-UTRAN 123 may trigger the UE to perform an inter-radio access technology (inter-RAT) measurement (Step S330*a*), i.e. the E-UTRAN 123 may ask the UE 110 to measure the cells of the inter-RAT and issue the measurement report to the E-UTRAN 123. Then, the UE 110 measures a list of candidate cells of the inter-RAT, wherein the list of candidate cells is determined according to the network configuration from the E-UTRAN 123 (Step S340*a*). Then, the UE 110 adjusts the measurement order of the list of candidate cells according to the stored information previously collected by the UE 110, wherein the candidate cell belonging to the registered LA is set to a higher priority and measured first (Step S350*a*). After step S350*a*, the UE 110 issues a measurement report of the candidate cell with the higher priority to the E-UTRAN 123 (Step S360*a*). When the E-UTRAN 123 receives the measurement report from the UE 110, the E-UTRAN 123 may transmit a Handover (HO) or CellChangeOrder (CCO) command to the UE 110 (Step S370*a*). The UE 110 would switch to the candidate cell with the higher priority according to the Handover or CellChangeOrder command from the E-UTRAN 123 (Step S380*a*). In this embodiment of the invention, the candidate cells belonging to the non-registered LA are measured and reported later than the candidate cells belonging to the registered LA.

Figure 3B:
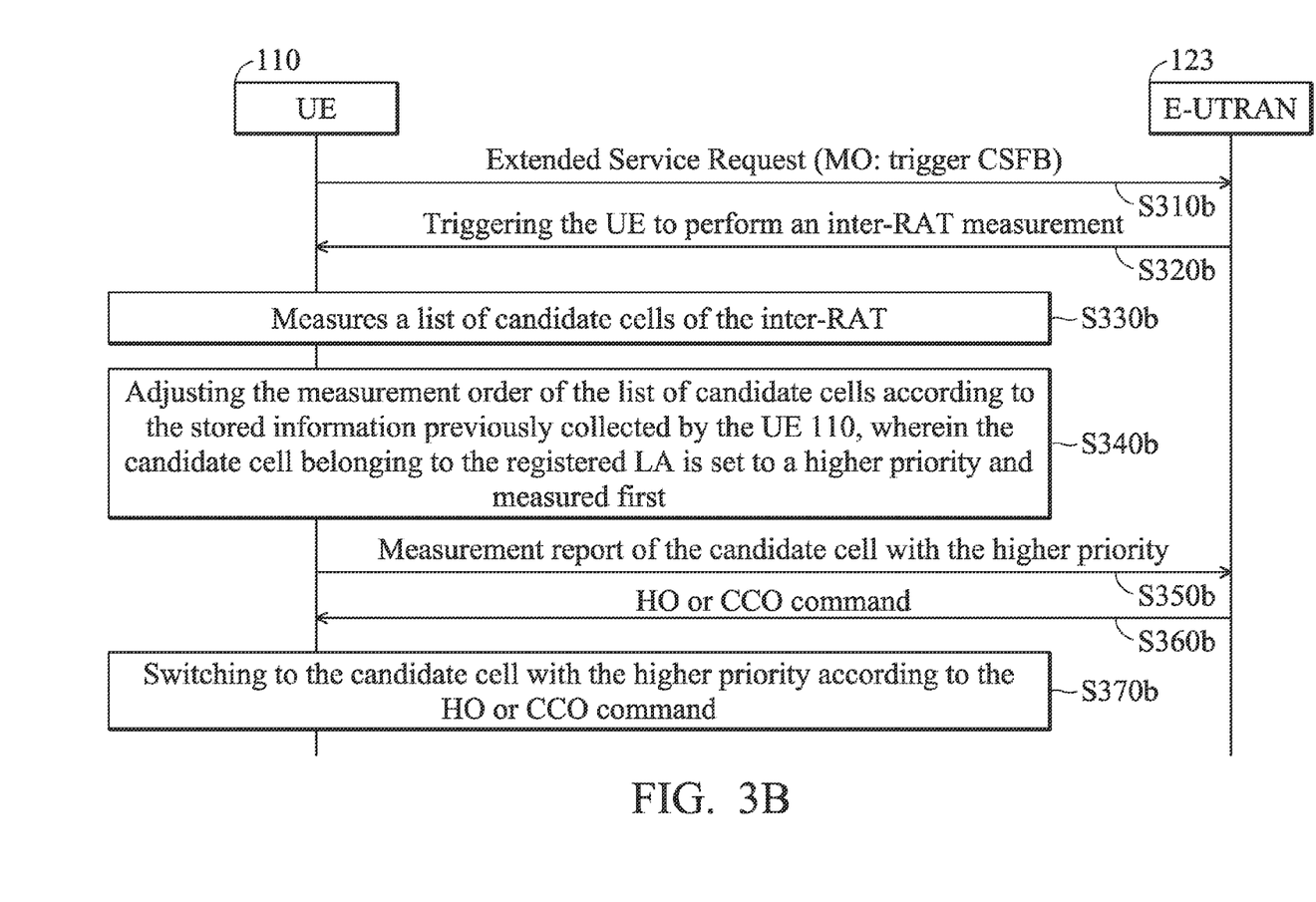
FIG. 3B is a message sequence chart illustrating the CSFB procedure based on the Measurement mechanism in a mobile communications system according to another embodiment of the invention.

FIG. 3b is a message sequence chart illustrating the CSFB procedure based on the Measurement mechanism in a mobile communications system according to an embodiment of the invention. First, the UE 110 may trigger the CSFB procedure by sending Extended Service Request message to the E-UTRAN through a MO CS call (Step S310*b*). After the UE 110 triggers the CSFB procedure by the MO CS call, the E-UTRAN 123 may trigger the UE to perform an inter-radio access technology (inter-RAT) measurement (Step S320*b*), i.e. the E-UTRAN 123 may ask the UE 110 to measure the cells of the inter-RAT and issue the measurement report to the E-UTRAN 123. Then, the UE 110 measures a list of candidate cells of the inter-RAT, wherein the list of candidate cells is determined according to the network configuration from the E-UTRAN 123 (Step S330*b*). Then, the UE 110 adjusts the measurement order of the list of candidate cells according to the stored information previously collected by the UE 110, wherein the candidate cell belonging to the registered LA is set to a higher priority and measured first (Step S340*b*). After step S340*b*, the UE 110 issues a measurement report of the candidate cell with the higher priority to the E-UTRAN 123 (Step S350*b*). When the E-UTRAN 123 receives the measurement report from the UE 110, the E-UTRAN 123 may transmit a Handover (HO) or CellChangeOrder (CCO) command to the UE 110 (Step S360*b*). The UE 110 would switch to the candidate cell with the higher priority according to the Handover or CellChangeOrder command from the E-UTRAN 123 (Step S370*b*). In this embodiment of the invention, the candidate cells belonging to the non-registered LA are measured and reported later than the candidate cells belonging to the registered LA.

In the prior art, the UE 110 may issue the measurement report without adjusting the measurement order of the list of candidate cells according to stored information previously collected by the UE 110. Therefore, the UE 110 may first issue the measurement report of the candidate cell which does not belong to the registered LA to the E-UTRAN 123. Therefore, the E-UTRAN 123 may make the wrong decision to Handover or CellChangeOrder the UE 110 to the candidate cell which does not belong to the registered LA. In addition, in the method based on the Measurement mechanism, the UE 110 may first issue the measurement report of the candidate cell which is measured first (i.e. the first candidate cell of the adjusted list) to the E-UTRAN 123, rather than issue the measurement report to the E-UTRAN 123 after all candidate cells on the list are measured by the UE 110. In this embodiment, the stored information collected by the UE 110 may be from a PLMN list, CSG list, Autonomous search, fingerprint collection or history collection. In this embodiment of the invention, the stored information further includes the location-update history of CSFB procedures triggered in frequently visited LTE cells. The details of the collection methods of stored information are the same as those described above for the redirection mechanism.

Figure 4A:
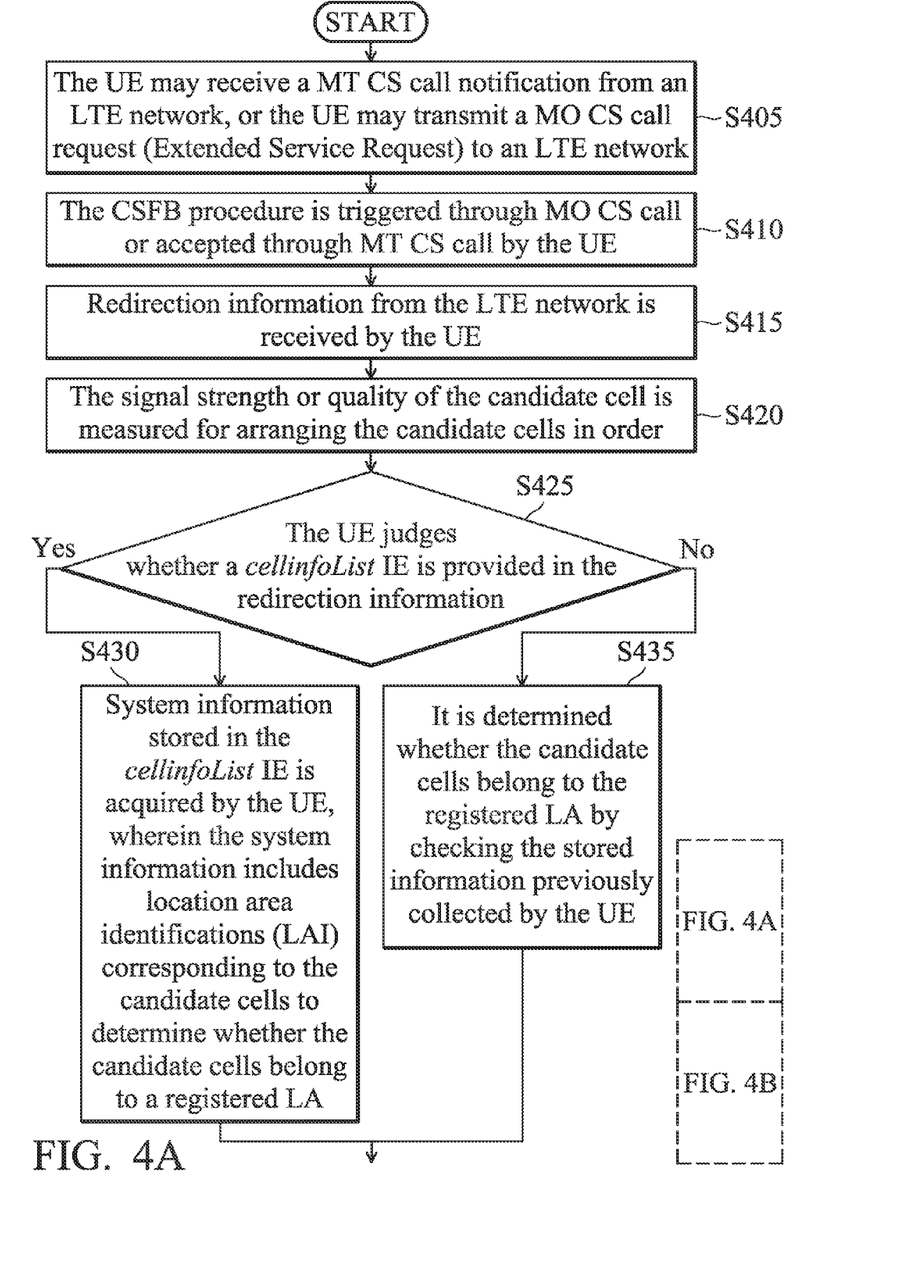
FIG. 4A-4B is a flow chart illustrating the method for CSFB based on the Redirection mechanism according to an embodiment of the invention.
Figure 4B:
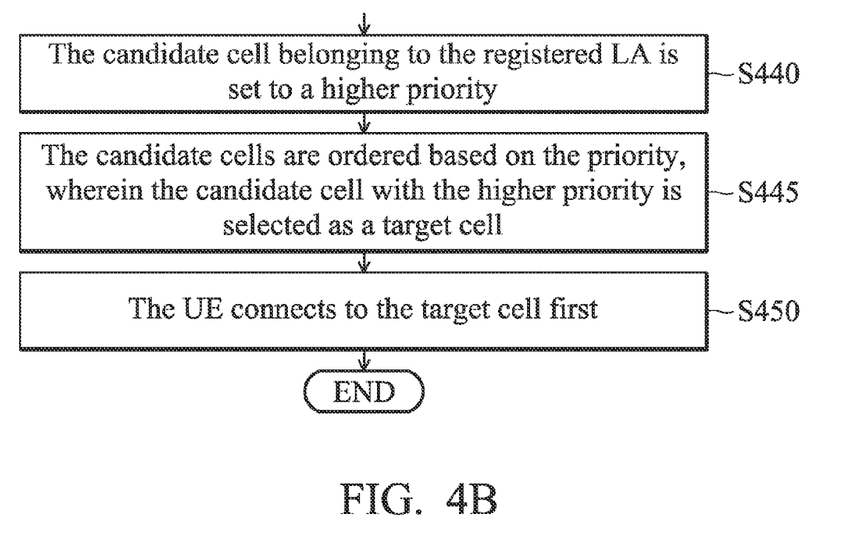

FIG. 4A-4B is a flow chart illustrating the method for CSFB based on the Redirection mechanism according to an embodiment of the invention. First, in step S405, the UE may receive a MT Circuit Switched (CS) call notification from an LTE network, or the UE may transmit a MO CS call request (Extended Service Request) to an LTE network (the step S405 may include the operations of the step S210*a*, S220*a* and S210*b*). In step S410, the CSFB procedure is triggered through MO CS call or accepted through MT CS call by the UE. In step S415, redirection information from the LTE network is received by the UE. In step S420, the signal strength and/or quality of the candidate cell is measured for arranging the candidate cells in order. In step S425, the UE judges whether a cellinfoList IE is provided in the redirection information. If the cellinfoList IE is provided in the redirection information, step S430 is executed. In step S430, system information stored in the cellinfoList IE is acquired by the UE, wherein the system information includes location area identifications (LAI) corresponding to the candidate cells to determine whether the candidate cells belong to a registered LA. If the cellinfoList IE is not provided in the redirection information, step S435 is executed. In step S435, it is determined whether the candidate cells belong to the registered LA by checking the stored information previously collected by the UE, wherein the stored information collected by the UE may be from a PLMN list, CSG list, Autonomous search, fingerprint collection, history collection or the location-update history of CSFB procedures triggered in frequently visited LTE cells. In step S440, the candidate cell belonging to the registered LA is set to a higher priority. In step S445, the candidate cells are ordered based on the priority, wherein the candidate cell with the higher priority is selected as a target cell. In step S450, the UE connects to the target cell first. Note that step S420 is an optional step. Therefore, the signal strength and/or quality of the cells and frequencies indicated in the redirection information may not need to be measured. In addition, in another embodiment of the invention, step S420 may be executed after step S425. In addition, in an embodiment of the invention, a load-balancing process is processed if there are more than one target cells selected from the candidate cells.

In the method based on the Redirection mechanism, the UE can judge whether a cellinfoList IE was previously provided in the redirection information and whether the candidate cell belongs to a registered LA to avoid connecting to a candidate cell which does not belong to the registered LA. Therefore, the extra call setup delay may not be generated because of the Location Area Update (LAU) process.

Figure 5:
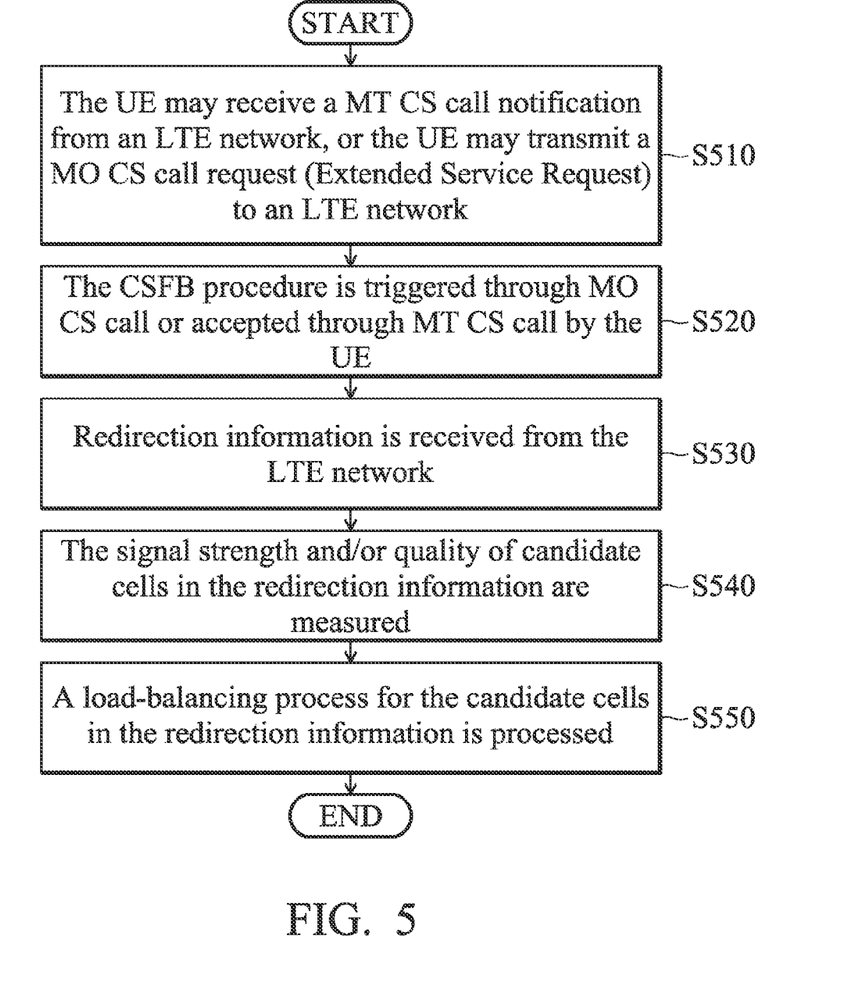
FIG. 5 is a flow chart illustrating the method for CSFB based on the Redirection mechanism according to another embodiment of the invention.

FIG. 5 is a flow chart illustrating the method for CSFB based on the Redirection mechanism according to another embodiment of the invention. First, in step S510, the UE may receive a MT Circuit Switched (CS) call notification from an LTE network, or the UE may transmit a MO CS call request (Extended Service Request) to an LTE network (the step S510 may include the operations of the step S210a, S220a and S210b). Then, in step S520 a CSFB procedure is triggered through MO CS call or accepted through MT CS call by the UE. In step S530, after the CSFB procedure is triggered, redirection information is received from the LTE network. In step S540, the signal strength and/or quality of candidate cells in the redirection information are measured before processing the load-balancing process. In step S550, a load-balancing process for the candidate cells in the redirection information is processed. In this embodiment, step S540 may not be executed.

Figure 6:
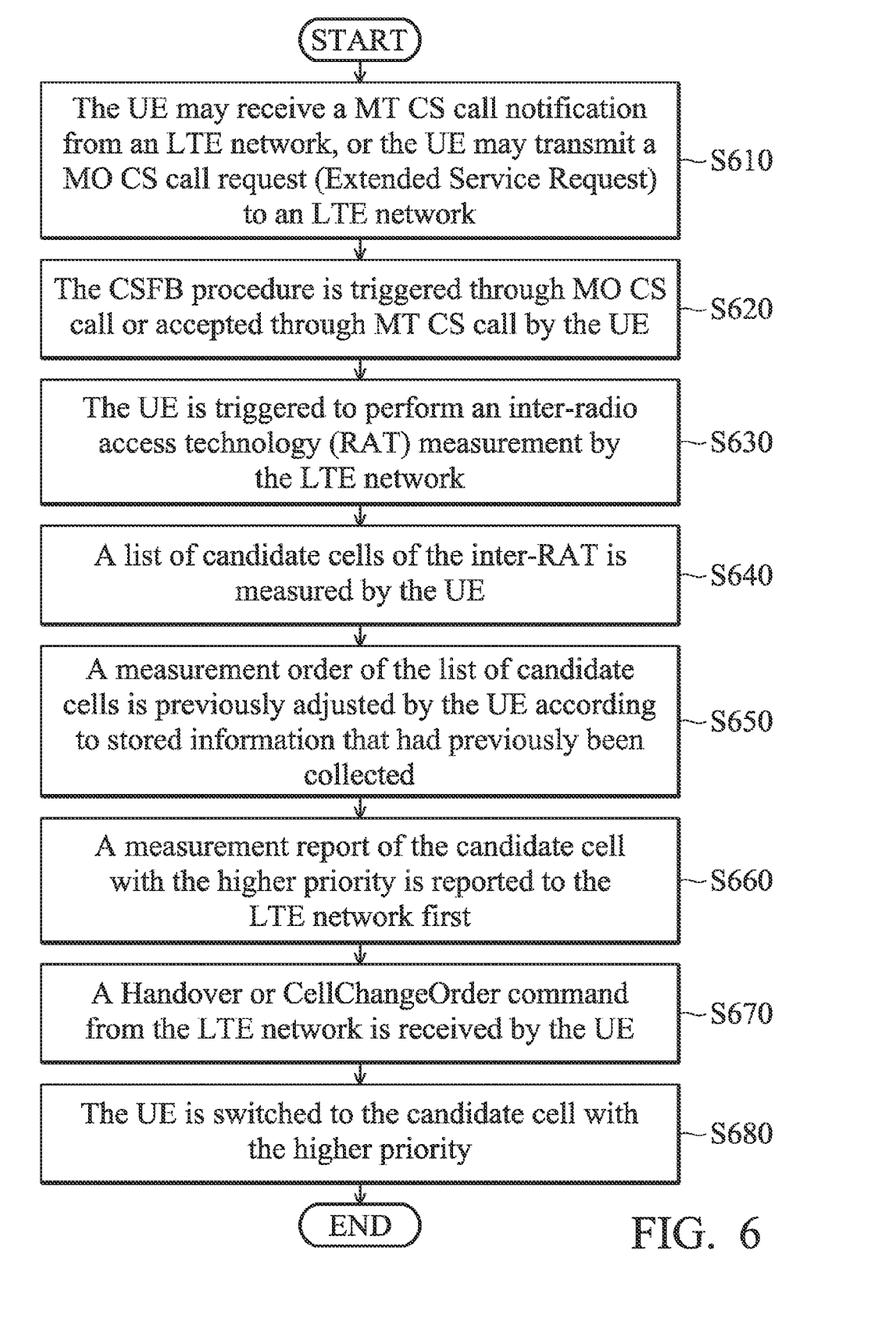
FIG. 6 is a flow chart illustrating the method for CSFB based on the Measurement mechanism according to an embodiment of the invention.

FIG. 6 is a flow chart illustrating the method for CSFB based on the Measurement mechanism according to an embodiment of the invention. First, in step S610, the UE may receive a MT Circuit Switched (CS) call notification from an LTE network, or the UE may transmit a MO CS call request (Extended Service Request) to an LTE network (the step S610 may include the operations of the step S310a, S320a and S310b). Then, in step S620, a CSFB procedure is triggered through MO CS call or accepted through MT CS call by the UE. In step S630, the UE is triggered to perform an inter-radio access technology (inter-RAT) measurement by the LTE network. In step S640, a list of candidate cells of the inter-RAT is measured by the UE, wherein the list of candidate cells is determined according to the network configuration from the LTE network. In step S650, a measurement order of the list of candidate cells is previously adjusted by the UE according to stored information that had previously been collected, wherein the candidate cell belonging to the registered LA is set to a higher priority and measured first. The stored information collected by the UE may be from a PLMN list, CSG list Autonomous search, fingerprint collection, history collection or the location-update history of CSFB procedures triggered in frequently visited LTE cells. In step S660, a measurement report of the candidate cell with the higher priority is reported to the LTE network first. In step S670, a Handover or CellChangeOrder command from the LTE network is received by the UE. In step S680, the UE is switched to the candidate cell with the higher priority. In this embodiment of the invention, the candidate cells belonging to the non-registered LA are measured and reported later than the candidate cells belonging to the registered LA.

In the method based on the Measurement mechanism, the UE can adjust the measurement order of the list of candidate cells to avoid issuing the measurement report of the candidate cell which does not belong to the registered LA to the LTE network first. Therefore, the extra call setup delay may not be generated because of the Location Area Update (LAU) process. In addition, in the method based on the Measurement mechanism, the UE may issue the measurement report of the candidate cell which is measured first (i.e. the first candidate cell of the adjusted list) to the LTE network first, rather than issue the measurement report to the LTE network after all candidate cells on the list are measured by the UE.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A method for Circuit Switched Fallback (CSFB) by a user equipment (UE), comprising:
triggering a CSFB procedure by a MO CS call or accepting the CSFB procedure by a MT CS call;
receiving redirection information from the LTE network;

judging whether system information corresponding to candidate cells is provided in cellinfoList IE of the redirection information;

acquiring system information corresponding to candidate cells if the system information corresponding to candidate cells is provided in the cellinfoList IE of the redirection information, wherein the system information includes location area identifications (LAI) corresponding to candidate cells in the redirection information to determine whether the candidate cells belong to a registered LA;

checking history information previously collected by the UE to determine whether the candidate cells belong to the same LA without performing location update after the CSFB procedure, if the system information corresponding to candidate cells is not provided in the cellinfoList IE of the redirection information;

setting the candidate cell belonging to the registered LA to a higher priority;

ordering the candidate cells based on the priority, wherein the candidate cell with higher priority is selected as a target cell; and connecting to the target cell.

2. The method of claim 1, further comprising:
measuring signal strength and/or quality of the candidate cells before or after judging whether the system information corresponding to candidate cells is provided in the redirection information for arranging the candidate cells in order.

3. The method of claim 2, wherein among the measured candidate cells with similar signal strength and/or quality, the measured candidate cell belonging to the registered LA is set to the higher priority to be selected as the target cell.

4. The method of claim 1, wherein the history information further comprises the location-update history of CSFB procedures triggered in frequently visited LTE cells.

5. The method of claim 1, further comprising:
processing a load-balancing process, if there are more than one target cells selected from the candidate cells.

6. The method of claim 1, further comprising:
processing a load-balancing process, if all the candidate cells do not belong to the registered LA.

7. A method for Circuit Switched Fallback (CSFB) for a user equipment (UE), comprising:
triggering a CSFB procedure by a MO CS call or accepting the CSFB procedure by a MT CS call;
triggering the UE to perform an inter-radio access technology (inter-RAT) measurement by the LTE network;
measuring a list of candidate cells of the inter-RAT;
adjusting a measurement order of the list of candidate cells according to history information previously collected by the UE, wherein the candidate cell belonging to a registered LA, without performing location update after the CSFB procedure, is set to a higher priority and measured;
issuing a measurement report of the candidate cell with the higher priority to the LTE network first;
receiving a Handover or CellChangeOrder command from the LTE network; and
switching the UE to the candidate cell with the higher priority.

8. The method of claim 7, wherein the list of candidate cells is determined according to network configuration from the LTE network.

9. The method of claim 7, wherein the candidate cells which do not belong to the registered LA are measured and reported after the candidate cells belonging to registered LA are measured and reported.

10. The method of claim 7, wherein the history information further comprises the location-update history of CSFB procedures triggered in frequently visited LTE cells.

11. An apparatus for Circuit Switched Fallback (CSFB), operating as a User Terminal (UE), comprising:
an RF signal processing device, configured to transmit a MO CS call request to a LTE network or receive a MT CS call notification from the LTE network;
a processor, configured to trigger or accept a CSFB procedure, wherein the transceiver receives redirection information sent from the LTE network after the CSFB procedure is triggered; and
a detection module, configured to determine whether system information corresponding to candidate cells is provided in cellinfoList IE of the redirection information,
wherein the processor sets candidate cells from the cellinfoList IE of the redirection information which belong to a registered LA to a higher priority, then selects the candidate cell with the higher priority as a target cell and connects to the target cell.

12. The apparatus for Circuit Switched Fallback (CSFB) of claim 11, further comprising:
a memory device, configured to store information previously collected by the UE.

13. The apparatus for Circuit Switched Fallback (CSFB) of claim 12, wherein if the system information corresponding to candidate cells is provided in the cellinfoList IE of the redirection information, the processor acquires system information corresponding to candidate cells, wherein the system information includes location area identifications (LAI) corresponding to the candidate cells to determine whether the candidate cells belong to the registered LA.

14. The apparatus for Circuit Switched Fallback (CSFB) of claim 13, wherein if the system information corresponding to candidate cells is not provided in the cellinfoList IE of the redirection information, the processor checks history information to determine whether the candidate cells belong to the registered LA.

15. The apparatus for Circuit Switched Fallback (CSFB) of claim 11, wherein the processor measures signal strength and/or quality of the candidate cells before or after judging whether the system information corresponding to candidate cells is provided in the cellinfoList IE of the redirection information for arranging the candidate cells in order.

16. The apparatus for Circuit Switched Fallback (CSFB) of claim 15, wherein among the measured candidate cells with similar signal strength and/or quality, the measured candidate cell belonging to the registered LA is set to a higher priority to be selected as the target cell.

17. The apparatus for Circuit Switched Fallback (CSFB) of claim 11, wherein the processor processes a load-balancing process, if there are more than one target cells selected from the candidate cells.

18. The apparatus for Circuit Switched Fallback (CSFB) of claim 11, wherein the processor processes a load-balancing process, if all the candidate cells do not belong to the registered LA.

19. An apparatus for Circuit Switched Fallback (CSFB), operating as a User Terminal (UE), comprising:
an RF signal processing device, configured to transmit a MO CS call request to a LTE network or receive a MT CS call notification from the LTE network and issue a measurement report to the LTE network; and a processor, configured to trigger or accept a CSFB procedure, perform an inter-radio access technology (inter-RAT) measurement, measure a list of candidate cells of the inter-RAT, and adjust a measurement order of the list of candidate cells according to history information previously collected by the UE, wherein the candidate cell belonging to a registered LA is set to a higher priority and measured, wherein the LTE network transmit a Handover or CellChangeOrder command to the UE according to the measurement report of the candidate cell with the higher priority to the LTE network for switching the UE to the candidate cell with the higher priority.

20. The apparatus for Circuit Switched Fallback (CSFB) of claim 19, wherein the list of candidate cells is determined according to network configuration from the LTE network.

21. The apparatus for Circuit Switched Fallback (CSFB) of claim 19, wherein the candidate cells which do not belong to the registered LA are measured and reported after the candidate cells belonging to registered LA are measured and reported.

* * * * *